United States Patent [19]

Harless et al.

[11] Patent Number: 5,406,876
[45] Date of Patent: Apr. 18, 1995

[54] STORE RETENTION AND RELEASE SYSTEM

[75] Inventors: Bobby T. Harless, Gardena; Michael B. Laurent, Cypress, both of Calif.

[73] Assignee: Northrop Grumman Corporation, Los Angeles, Calif.

[21] Appl. No.: 263,274

[22] Filed: Jun. 21, 1994

[51] Int. Cl.⁶ .......................... B64D 1/12; F41F 3/06
[52] U.S. Cl. .................................. 89/1.54; 244/137.4; 89/1.51
[58] Field of Search ............... 89/1.59, 1.54, 1.51; 244/137.1, 137.4; 294/99.1, 82.26

[56] References Cited

U.S. PATENT DOCUMENTS

| | | | |
|---|---|---|---|
| 2,478,019 | 8/1949 | Sonntag | 294/83 |
| 2,796,284 | 6/1957 | Benson et al. | 294/83 |
| 3,181,908 | 5/1965 | Clark | 294/83 |
| 3,810,671 | 5/1974 | Jeffrey | 294/83 AE |
| 3,877,343 | 4/1975 | Newell et al. | 89/1.5 R |
| 3,883,097 | 5/1975 | Billot | 244/137 R |
| 3,911,786 | 10/1975 | Scheetz et al. | 89/1.5 R |
| 3,974,990 | 8/1976 | Holt et al. | 244/137 R |
| 4,017,112 | 4/1977 | Delest | 294/83 R |
| 4,120,232 | 10/1978 | Hoffman, Jr. | 89/1.5 R |
| 4,132,147 | 1/1979 | Contaldo | 89/1.5 G |
| 4,257,639 | 3/1981 | Stock | 294/83 R |
| 4,523,731 | 6/1985 | Buitekant et al. | 244/137 R |
| 4,827,550 | 5/1989 | Graham et al. | 15/22 R |
| 5,107,749 | 4/1992 | Norrvi | 89/1.57 |

Primary Examiner—Charles T. Jordan
Assistant Examiner—Christopher Keith Montgomery
Attorney, Agent, or Firm—Terry J. Anderson; Karl J. Hoch, Jr.

[57] ABSTRACT

A system for releasably supporting a store on a rack comprises a conical lug mounted on the store and a hollow locking ring which extends between minor and major rims defining circular openings, respectively. A plurality of ribs extends between the minor and major rims at equally spaced circumferential locations. The ribs are aligned with the longitudinal axis of the locking ring and define windows between them. A collet includes a mounting head for attachment to the rack and a plurality of integral, circumferentially spaced, resilient, locking fingers, equal in number to the ribs and windows in the locking ring, which extend divergingly, away from the mounting head and have terminal projections which extend radially inwardly. Each locking finger is smaller than its associated window in the locking ring means. The collet nests with the locking ring such that the mounting head extends through its minor opening for attachment to the rack means and with the locking fingers projecting toward its major opening. Upon insertion of the lug into a reception region defined by the mounting head and the locking fingers and with each of the locking fingers aligned with an associated one of the windows, the locking fingers are engaged by the lug and urged radially outwardly into their associated windows until the terminal projections on the locking fingers firmly engage the annular groove on the lug, thereby securing the store to the rack. An actuating mechanism rotates the locking ring between a release position whereat each locking finger is radially aligned with an associated window and a locking position whereat each locking finger is aligned with an associated rib. An ejection mechanism may be provided on the rack for selectively ejecting the store from the rack means when the locking ring is in the release position.

13 Claims, 3 Drawing Sheets

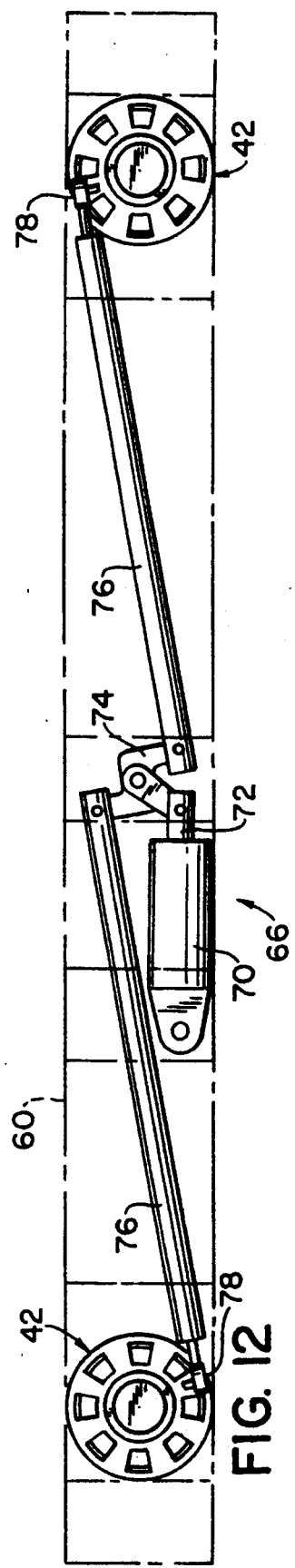
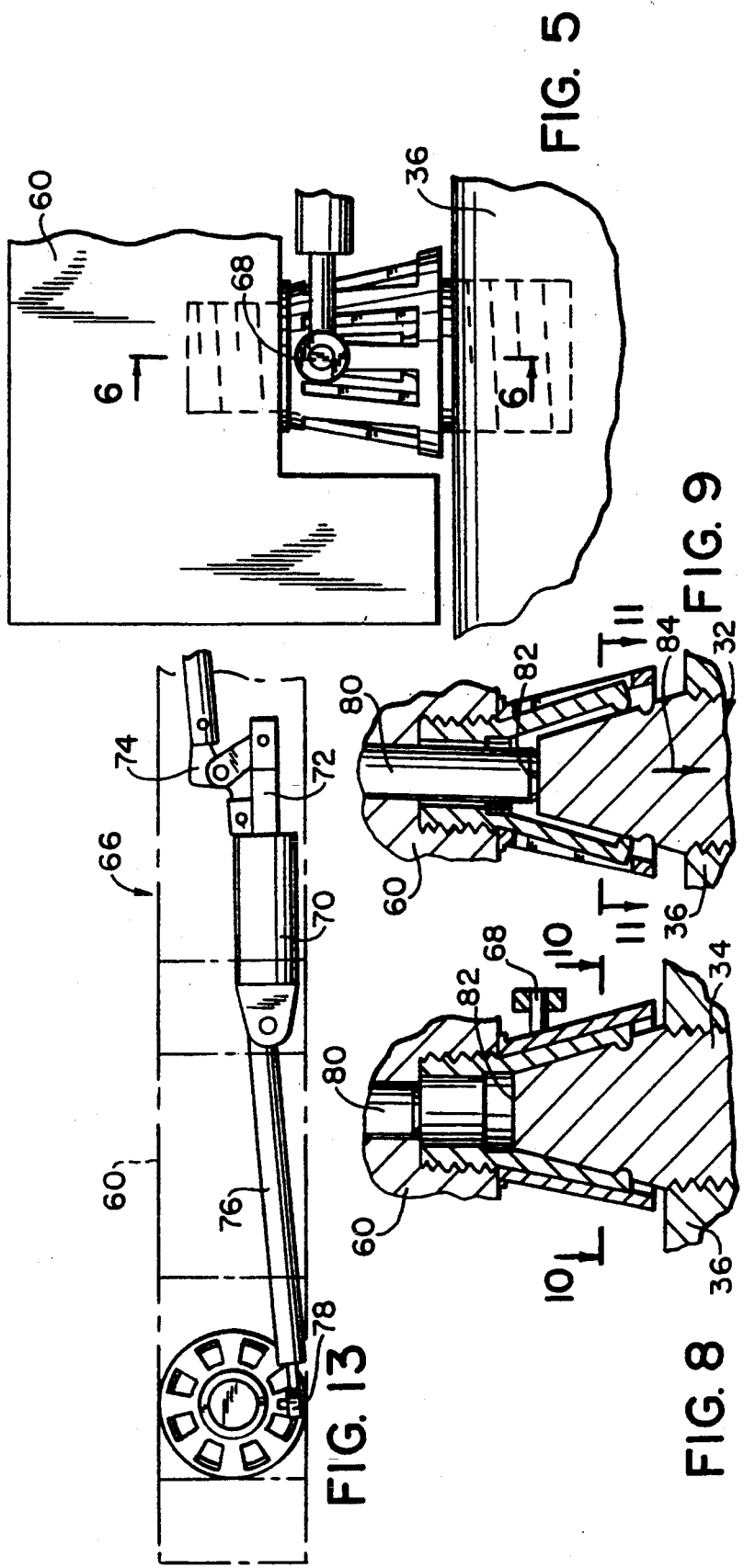
FIG. 5
FIG. 9
FIG. 8
FIG. 12
FIG. 13

STORE RETENTION AND RELEASE SYSTEM

BACKGROUND OF THE INVENTION

1. Field of the Invention

The present invention relates generally to the field of handling and release mechanisms, and more specifically to a positive retention and selectively releasable mechanism utilizing the resilient deflection of elongated members to effect retention and release of aircraft stores while providing tri-axial restraint.

2. Description of the Prior Art

Present combat aircraft employ a number of different types of ordnance such as, for example, missiles, rockets, bombs, and the like, which are referred to as stores. In addition, other objects such as auxiliary fuel tanks and mounting racks, to name just a couple, are suspended from the underside of aircraft during flight. A number of devices are currently used to secure these various stores and other objects to the aircraft. One type of device which has been widely used comprises a pair of rotatable hooks within the aircraft which selectively engage and release lug rings mounted on the store. While this arrangement is relatively simple, the store is free to rock from side to side once it is latched to the aircraft. To overcome this relatively dangerous condition, especially aboard an aircraft carrier that is constantly pitching, yawing and rolling, sway brace assemblies must be employed to restrain movement of the store after it is latched.

It is a further requirement that most stores be forcibly ejected away from the envelope of the aircraft during flight so as to not interfere with the aerodynamics of the aircraft nor endanger it, especially at supersonic speeds.

To achieve this object, launcher (or ejector) mechanisms are employed which forcibly eject the store from the aircraft at the proper attitude, speed, and position. It should be understood that the present invention does not include a specific provision for such a launcher (or ejector) mechanism, but is contemplated to be fully compatible with such mechanisms which may be of a variety of constructions.

A typical stores suspension is disclosed in U.S. Pat. No. 3,883,097, "Device for Picking Up and Ejecting Loads Under an Airplane", to Billot. Billot uses a ball detent device which engages recesses within the weapon. Release is accomplished by withdrawing a cam within the detent, allowing the balls to withdraw.

There are numerous prior art methods of combining ejection and suspension systems. For example, see U.S. Pat. No. 3,877,343, "Store Carriers", to Newell et al. Newell et al discloses a system wherein a pair of jaws engage a lug on the store, and are held in contact with the lug by a pair of roller cams. A spring-biased plunger in contact with the lug is used for ejection. Upon actuation, the roller cams are moved to a position whereby the jaws may open due to the weight of the weapon itself. After the jaws have opened, the spring-biased plunger ejects the store. The design of Newell et al has no integral sway bracing and the overall system is somewhat bulky.

Another example is provided in U.S. Pat. No. 3,810,671, "Jettison Device for Helicopter Load Carrying System", to Jeffery. The Jeffery device comprises a housing in which a pair of jaws are locked into engagement with a lug mounted on a store by an explosively actuated piston rod. Upon actuation, movement of the piston rod releases the jaws and the rod ejects the store pushing the jaws out of the way. As in the previous example, there is no integral sway bracing. Furthermore, Jeffery's concept would be somewhat difficult to reset.

High speed maneuvers and airflow induced vibrations also induce loads in the lateral plane which must be absorbed. Thus, sway braces are provided to restrain the store in the lateral plane. These are normally forged arms protruding from the rack with the manually adjustable pads to accommodate varying stored diameters. A typical prior art sway brace is disclosed in U.S. Pat. No. 3,181,908, "Single-Point Launching Device", to Clark. Manually adjusting such sway braces is time consuming for they are often difficult to reach within store bays because of the limited access available.

Known automatic sway braces also add protrusions to otherwise slender bomb ejector racks which have several undesirable effects. First, they add aerodynamic drag. Second, they greatly complicate the job of cleaning up the aircraft outer mold line or skin after store release. They must be retracted by some additional mechanism which is not required by the system of the invention. This additional retraction equipment adds weight, complication (both structural and electronic) and, by nature of the added complication, increases cost while decreasing reliability.

SUMMARY OF THE INVENTION

It was in light of the prior art as just described that the present invention was conceived and has now been reduced to practice. To this end, a system is disclosed for releasably supporting a store on a rack. It comprises a conical lug mounted on the store and an associated hollow locking ring which extends between minor and major rims defining circular openings, respectively. A plurality of ribs extends between the minor and major rims at equally spaced circumferential locations. The ribs are aligned with the longitudinal axis of the locking ring and define windows between them. A collet includes a mounting head for attachment to the rack and a plurality of integral, circumferentially spaced, resilient, locking fingers, equal in number to the ribs and windows in the locking ring, which extend divergingly, away from the mounting head and have terminal projections which extend radially inwardly. Each locking finger is smaller than its associated window in the locking ring means. The collet nests with the locking ring such that the mounting head extends through its minor opening for attachment to the rack means and with the locking fingers projecting toward its major opening. Upon insertion of the lug into a reception region defined by the mounting head and the locking fingers and with each of the locking fingers aligned with an associated one of the windows, the locking fingers are engaged by the lug and urged radially outwardly into their associated windows until the terminal projections on the locking fingers firmly engage the annular groove on the lug, thereby securing the store to the rack. An actuating mechanism rotates the locking ring between a release position whereat each locking finger is radially aligned with an associated window and a locking position whereat each locking finger is aligned with an associated rib. An ejection mechanism may be provided on the rack for selectively ejecting the store from the rack means when the locking ring is in the release position.

Accordingly, it is a general purpose and object of the present invention to provide a novel positive locking retention and release mechanism which is of relatively low weight, small size and low cost, is simple to operate and substantially reusable. A primary object, however, resides in its simplified construction which results in significantly reduced drag and a minimal radar profile. It is a further object to provide such a mechanism for retaining and selectively releasing aircraft stores in a safe and reliable manner and simultaneously provides sway bracing to counteract laterally improved loading.

Yet a further object is to provide a mechanism which requires only a minimum of access for use with aircraft employing store carriage methods which hinder access to the store carriage and release device. Such methods include carriage in internal weapon bays, tangential/conformal carriage and semi-submerged carriage.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

BRIEF DESCRIPTION OF THE DRAWINGS

FIG. 5 is a detail side elevation view of the system of the invention in its retention configuration;

FIGS. 8 and 9 are cross section views, similar to FIG. 6, illustrating two different positions of the components of the invention;

FIGS. 12 and 13 are top plan views of the system illustrated in FIG. 3 and depicting, respectively, two different positions thereof.

DETAILED DESCRIPTION OF THE PREFERRED EMBODIMENT

Figure 1:
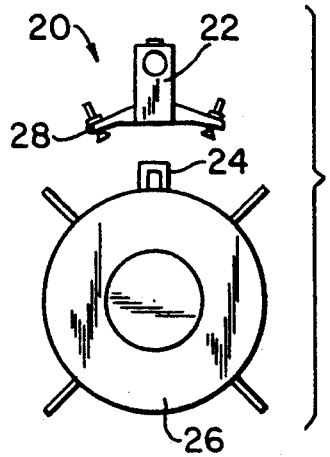
FIG. 1 is a front elevation view diagrammatically depicting a known construction of a store retention and release system.

Turn now to the drawings and, initially to FIG. 1 which illustrates a known design of a release mechanism. In such a known design, a bomb rack 20 employs a hook device 22 which fits into, or engages, a bale lug 24 on a store 26. Sway braces 28 keep the store 26 preloaded against the hook device 22 and prevent side-to-side motion of the store. In the store retention and release system 30 of the invention (FIGS. 2 and 3) there are no sway braces, resulting in substantially reduced drag and a diminished radar cross-section when compared to the conventional rack 20. Because the system 30 has no sway braces, it is adaptable to conformal carriage where there is no room for sway braces or sway brace adjustment.

Figure 2:
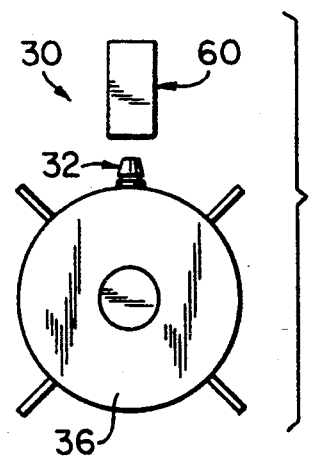
FIG. 2 is a diagrammatic front elevation view, similar to FIG. 1, illustrating a store retention and release system embodying the present invention.
Figure 3:
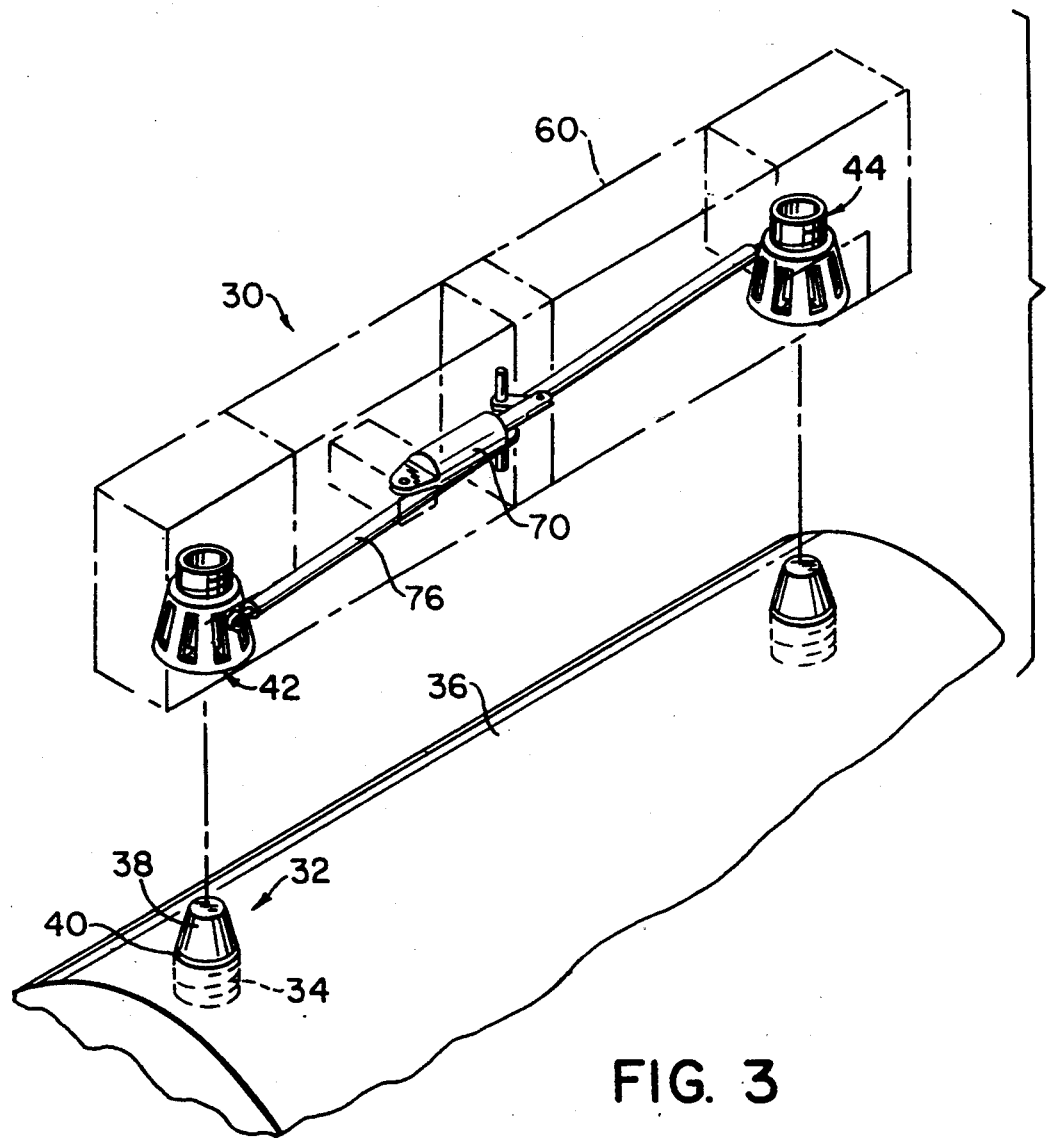
FIG. 3 is a partially exploded view, in perspective, illustrating the store retention and release system of the invention.

As seen in FIGS. 2 and 3, a lug 32 is preferably a solid member including a base 34 for suitable mounting on a store 36. The lug 32 has a right conical outer engagement surface 38 and an annular groove 40 encircling the engagement surface.

Figure 4:
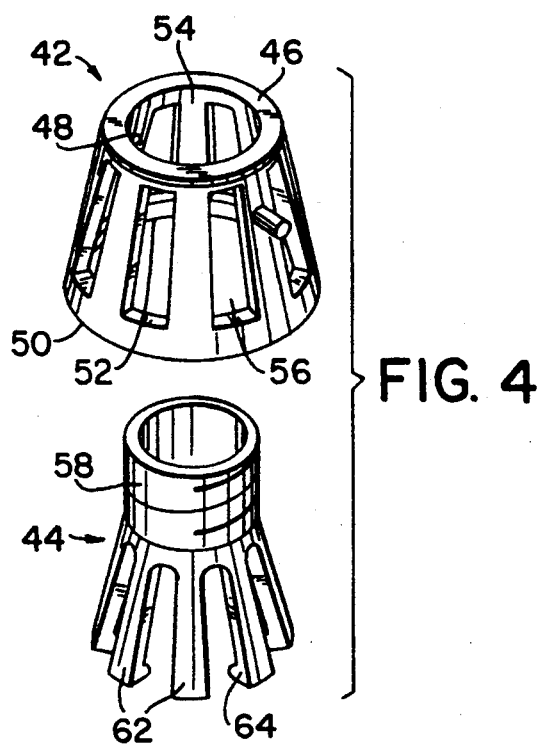
FIG. 4 is an exploded view illustrating two components of the invention.

The lug 32 cooperates with a pair of components best illustrated in FIG. 4, specifically, with a hollow locking ring 42 and with a collet 44. The locking ring 42 is shaped as a truncated cone and extends between a minor rim 46 which defines a minor circular opening 48 and a major rim 50 which defines a major circular opening 52. The locking ring 42 has a plurality of ribs 54 which extend between the minor rim 46 and the major rim 50 at equally spaced circumferential locations. Each of the ribs is disposed to be generally coplanar with a longitudinal axis of the locking ring. Additionally, each successive pair of the ribs 54 defines a window 56 between them.

The collet 44 has a cylindrical mounting head 58 which may be threaded or otherwise configured for attachment to a supporting rack 60 which is an integral part of an aircraft. It may be located within the fuselage or external in the manner of a pylon.

A plurality of locking fingers 62 are integral with and extend away from the mounting head 58. They are equal in number to the windows 56 and the ribs 54 in the locking ring 42. The locking fingers 62 all diverge from a central axis of the collet 44 with increased distance from the mounting head. Each of the locking fingers 62 has a width and a length which is smaller than an associated one of the windows 56 in the locking ring 42. Also, each locking finger 62 has a terminal projection 64 at its tip end which extends radially inwardly from its associated locking finger.

Figure 7:
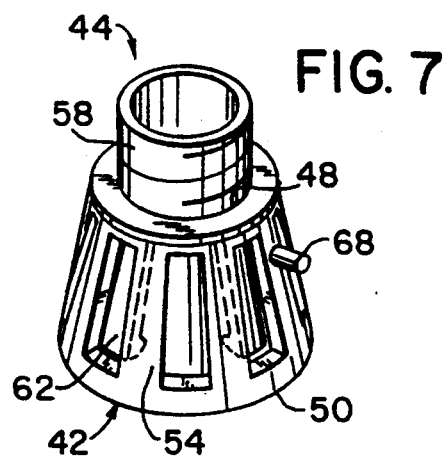
FIG. 7 is a perspective view of the components of FIG. 4 shown in their nested condition.
Figure 6:
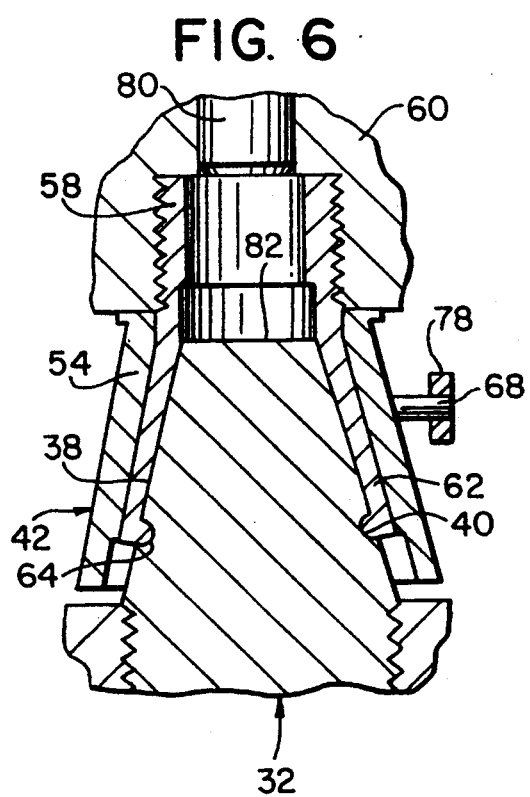
FIG. 6 is a cross sectional view taken generally along line 6—6 in FIG. 5.

As most clearly seen in FIG. 5, 6 and 7, the collet 44 is engageable with the locking ring 42 in a nested relationship such that the mounting head 50 extends through the minor opening 48 of the locking ring for attachment to the rack 60 and with the locking fingers 62 projecting toward the major opening 52.

Figure 10:
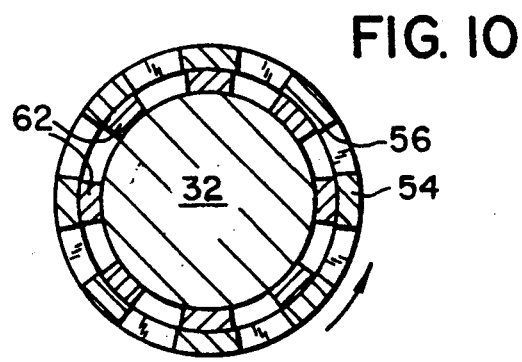
FIG. 10 is a cross-section view taken generally along line 10—10 in FIG. 8.
Figure 11:
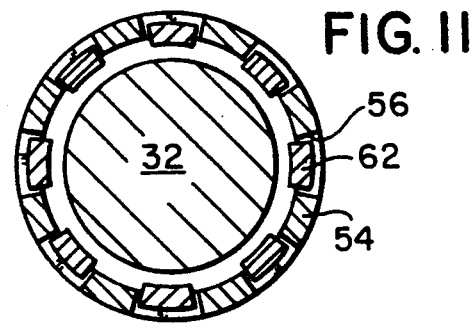
FIG. 11 is a cross-section view taken generally along line 11—11 in FIG. 9.

With the unified device comprising the collet 44 and locking ring 42 mounted on the rack 60 in the manner generally illustrated in FIG. 6, the locking ring 42 is rotatable on its longitudinal axis between a locking position at which each of the ribs 54 is radially aligned with each of the locking fingers 62 and a release position at which each of the windows 56 is radially aligned with each of the locking fingers 62. The locking position is generally illustrated by FIGS. 8 and 10 and the release position is generally illustrated by FIGS. 9 and 11.

In order to attach the store 36 to the rack 60, the lug 32 is advanced into engagement with the nested combination of the locking ring 42 and collet 44. As seen FIG. 3, it is customary for connections to be made at a pair of spaced apart locations on the store 36 and on the rack 60. For the connection operation, the locking ring 42 is in the release position best depicted by FIG. 11, that is, with the locking fingers 62 being radially aligned with each of the windows 56. With the locking ring 42 thus positioned, the lug 32 is advanced into a reception region which is defined by the interior of the mounting head 58 and of the locking fingers 62 until the terminal projections 64 on the locking fingers come into engagement with the engagement surface 38 and finally into engagement with the annular groove 40 (FIG. 6). Immediately before the terminal projections 64 come into engagement with the annular groove 40, locking fingers 62 actually protrude into their associated windows 56 in the locking ring 42. When the terminal projections 64 of all of the locking fingers 62 are fully engaged with the annular groove 40 on the lug 32, the locking ring 42 is rotated on its longitudinal axis to the locking position best illustrated in FIG. 10.

An actuating mechanism 66 for accomplishing this movement will now be described with particular reference to FIGS. 12 and 13. As best seen in FIGS. 4, 5, 6, 7 and 8, an actuating pin 68 projects radially from the locking ring 42. A suitable actuator 70 which may be electrically, hydraulically, or pneumatically energized is pivotally mounted to the rack 60. An actuating shaft 72 is connected, via a bell crank 74 to a pair of opposed links 76 which are pivotally engaged at their distant ends, via a fitting 78, to the their respective actuating pins 68. The actuating mechanism 66 is illustrated in FIG. 12 with the locking ring 42 in the release position whereas in FIG. 13 the actuating mechanism is illustrated with the locking ring in the locking position.

The system 30 of the invention is likely to be employed in combination with an ejection mechanism on the rack 60 for positively, forcibly, ejecting the store 36 from the rack. Any suitable device can be employed and such a suitable device is represented by an ejector plunger 80 which can be advanced from a retracted position as illustrated in FIGS. 6 and 8 to an advanced position as illustrated in FIG. 9. In the advanced position illustrated in FIG. 9, the plunger 80 is caused to strike an end surface 82 of the lug 32, propelling the lug and, with it, the store 36 in the direction of an arrow 84. It will be appreciated that immediately before actuation of the ejector plunger 80, the locking ring 42 will have been moved by the actuating mechanism 66 to the release position illustrated in FIGS. 11 and 12.

Figure 14:
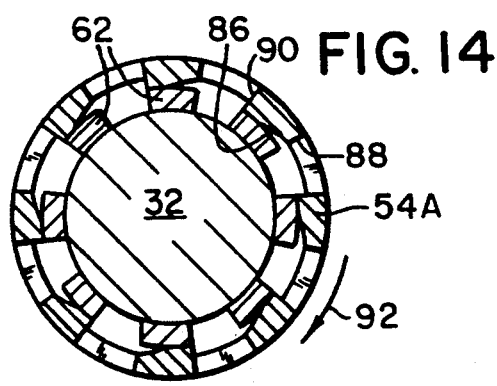
FIG. 14 is a cross-section view, similar to FIG. 10, illustrating another embodiment of the invention.

Another embodiment of the invention is illustrated in FIG. 14. In this embodiment, modified ribs 54A are formed with an angled inner surface 86, a leading edge 88, a trailing edge 90 and thus have a wedge-shaped cross-section. The modified rib 54A is thinner at the leading edge than at the trailing edge. By reason of this construction, as the actuating mechanism 66 is operated to move the locking ring 42 in the direction of an arrow 92, each of the locking fingers 62 is caused to engage the inner surface 86 and such engagement continues from the narrower portion of the inner surface 86 to the thicker portion of the inner surface 86. When the locking ring reaches the fully locked position illustrated in FIG. 14, the greatest possible bias, directed radially inwardly, is therefore imparted on the locking fingers 62 to firmly hold the terminal projections 64 firmly engaged with the annular groove 40.

The construction of the system 30 just described, therefore, provides for positive, firm, retention of the store, yet permits for rapid release of the store when called for. By reason of the circumferential gripping of the annular groove 40 by the plurality of locking fingers 62, need for sway bracing is eliminated while providing adequate constraints against possible undesirable lateral movement of the store.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A system for releasably supporting a store on a rack structure comprising:

lug means including a base mounted on the store and a right conical outer engagement surface and having an annular groove in said engagement surface;

hollow locking ring means shaped as a truncated cone having a longitudinal axis and extending between a minor rim defining a minor circular opening and a major rim defining a major circular opening, said locking ring means having a plurality of ribs extending between said minor rim and said major rim at equally spaced circumferential locations, each of said ribs disposed to be generally coplanar with said longitudinal axis, each successive pair of said ribs defining a window therebetween;

collet means including:

a cylindrical mounting head having attachment means thereon and a central axis for attachment to the rack means;

a plurality of locking fingers, equal in number to the windows in said locking ring means, being integral with and extending away from said mounting head and diverging from said central axis with increased distance from said mounting head, each of said locking fingers having a width and length smaller than an associated one of the windows in said locking ring means; and terminal projections at the tip ends of said locking fingers extending radially inwardly;

said collet means being engageable with said locking ring in a nesting relationship with said mounting head extending through the minor opening of said locking ring for attachment to the rack means and with said locking fingers projecting toward said major opening;

said locking ring means being rotatable on said longitudinal axis between a locking position whereat each of said ribs is radially aligned with each of said locking fingers and a release position whereat each of the windows therein is radially aligned with each of said locking fingers;

whereby insertion of said lug means into a reception region defined by said mounting head and said locking fingers when said locking ring means is in the release position causes said locking fingers to be urged radially outwardly into their associated windows until said terminal projections on said locking fingers are biased into engagement with the annular groove on said lug means and thereafter said locking ring means is rotated to the locking position, thereby securing the store to the rack means.

2. A system as set forth in claim 1 including:

actuating means for rotating said locking ring means between said locking position and said release position.

3. A system as set forth in claim 2
wherein said actuating means includes:

an actuating pin projecting radially from said locking ring means;

an actuator pivotally mounted to the rack means; and linkage means pivotally connecting said actuator and said actuating pin.

4. A system as set forth in claim 1 wherein each of said ribs has an inner surface, a leading edge and a trailing edge and has a wedge-shaped cross section, being thinner at said leading edge than at said trailing edge;

whereby, upon rotation of said collet means from the release position to the locking position, each of said locking fingers is caused to engage said inner surface of an associated one of said ribs and urge said fingers radially inwardly toward said longitudinal axis and more firmly into engagement with the annular groove on said lug means.

5. A system as set forth in claim 1 including: ejection means on the rack means for selective forceful engagement with said lug means when said collet means is in the release position for ejecting the store from the rack means.

6. A system for releasably supporting a store on a rack means comprising:

lug means for mounting on the store and having an outer engagement surface and an annular groove in said engagement surface;

hollow locking ring means having a longitudinal axis and extending between first and second rims and defining first and second openings, respectively, said locking ring means having a plurality of ribs extending between said first rim and said second rim at equally spaced circumferential locations, each of said ribs being disposed generally coplanar with said longitudinal axis, each successive pair of said ribs defining a window therebetween;

collet means including:
a mounting head having a central axis for attachment to the rack means;
a plurality of locking fingers, equal in number to said ribs, being integral with and extending away from said mounting head and diverging from said central axis with increased distance from said mounting head, each of said locking fingers having a width and length smaller than an associated one of the windows in said locking ring means; and
terminal projections at the tip ends of said locking fingers extending radially inwardly;

said collet means being engageable with said locking ring in a nesting relationship with said mounting head extending through the minor opening of said locking ring for attachment to the rack means and with said locking fingers projecting toward said major opening;

said locking ring means being rotatable on said longitudinal axis between a locking position whereat each of said ribs is radially aligned with each of said locking fingers and a release position whereat each of the windows therein is radially aligned with each of said locking fingers;

whereby insertion of said lug means into a reception region defined by said mounting head and said locking fingers when said locking ring means is in the release position causes said locking fingers to be urged radially outwardly into their associated windows until said terminal projections on said locking fingers are biased into engagement with the annular groove on said lug means and thereafter said locking ring means is rotated to the locking position, thereby securing the store to the rack means.

7. A system as set forth in claim 6 including: actuating means for rotating said locking ring means between said locking position and said release position.

8. A system as set forth in claim 7 wherein said actuating means includes:

an actuating pin projecting radially from said locking ring means; an actuator pivotally mounted to the rack means; and linkage means pivotally connecting said actuator and said actuating pin;

whereby operation of said actuator means is effective to rotate said locking ring about said longitudinal axis between the locking position and the release position.

9. A system as set forth in claim 6 wherein each of said ribs has an inner surface, a leading edge and a trailing edge and has a wedge-shaped cross section, being thinner at said leading edge than at said trailing edge;

whereby, upon rotation of said collet means from the release position to the locking position, each of said locking fingers is caused to engage said inner surface of an associated one of said ribs and urge said fingers radially inwardly toward said longitudinal axis and more firmly into engagement with the annular groove on said lug means.

10. A system as set forth in claim 6 including: ejection means on the rack means for selective forceful engagement with said lug means when said collet means is in the release position for ejecting the store from the rack means.

11. A system for releasably supporting a store on a rack means comprising:

first and second lug means for mounting at spaced apart locations on the store and each having an outer engagement surface and an annular groove in said engagement surface;

first and second hollow locking ring means, each having a longitudinal axis and extending between first and second rims and defining first and second openings, respectively, each said locking ring means having a plurality of ribs extending between said first rim and said second rim at equally spaced circumferential locations, each of said ribs being disposed generally coplanar with said longitudinal axis, each successive pair of said ribs defining a window therebetween;

first and second collet means mounted on the rack means at spaced apart locations, each including:
a mounting head having a central axis for attachment to the rack means;
a plurality of locking fingers, equal in number to said ribs, being integral with and extending away from said mounting head and diverging from said central axis with increased distance from said mounting head, each of said locking fingers having a width and length smaller than an associated one of the windows in said locking ring means, said mounting head and said locking fingers together defining a reception region; and
terminal projections at the tip ends of said locking fingers extending radially inwardly; said first and second locking ring means being rotatable on said longitudinal axis between a locking position whereat each of said ribs is radially aligned with each of said locking fingers and a release position whereat each of the windows therein is radially aligned with each of said locking fingers;

whereby insertion of said first lug means into an associated reception region defined by said mounting head and said locking fingers of said first collet means when said first locking ring means is in the release position and of said second lug means into an associated reception region defined by said mounting head and said locking fingers of said second collet means when said second locking ring means is in the release position causes said locking fingers to be urged radially outwardly into their associated windows until said terminal projections on said locking fingers are biased into engagement with the annular grooves on said first and second lug means and thereafter said first and second locking ring means are rotated to the locking position, thereby securing the store to the rack means at a pair of locations.

12. A system as set forth in claim 11 including:
actuating means for simultaneously rotating said first and second locking ring means between said locking positions and said release positions.

13. A system as set forth in claim 12
wherein said actuating means includes:
  an actuating pin projecting radially from said first and second locking ring means, respectively;
  an actuator pivotally mounted to the rack means; and
  first linkage means pivotally connecting said actuator and said actuating pin of said first locking ring means;
  second linkage means pivotally connecting said actuator and said actuating pin of said second locking ring means;
  whereby operation of said actuator means is effective to simultaneously rotate said first and second locking rings about said associated longitudinal axis between the locking position and the release position.

* * * * *